Jan. 24, 1961 E. M. KATZIN 2,969,141
THERMOMETER COVER
Filed June 17, 1957 2 Sheets-Sheet 1
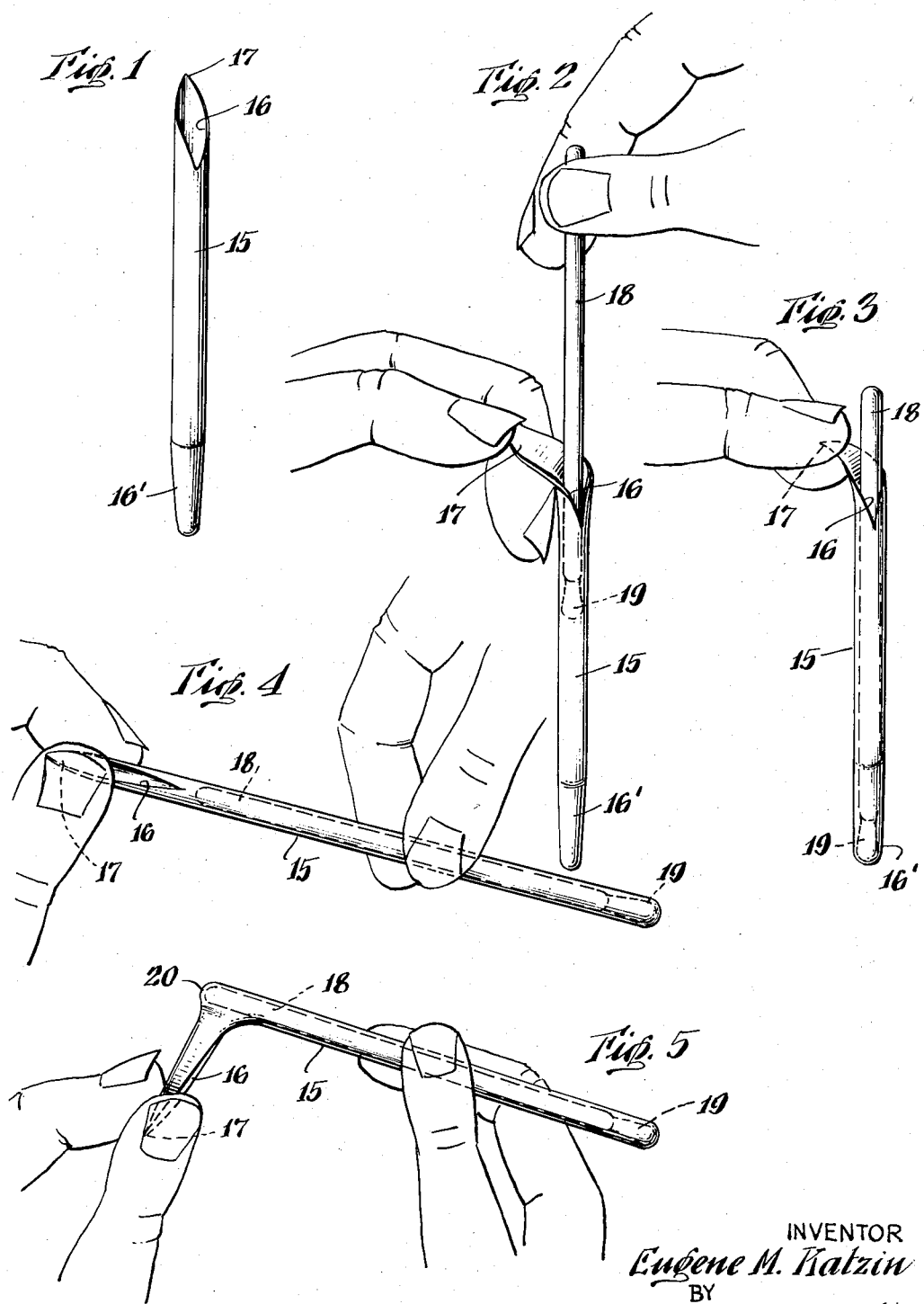
INVENTOR
Eugene M. Katzin
BY
Kane, Dalsimer and Kane
ATTORNEYS Jan. 24, 1961
E. M. KATZIN
2,969,141
THERMOMETER COVER
Filed June 17, 1957
2 Sheets-Sheet 2
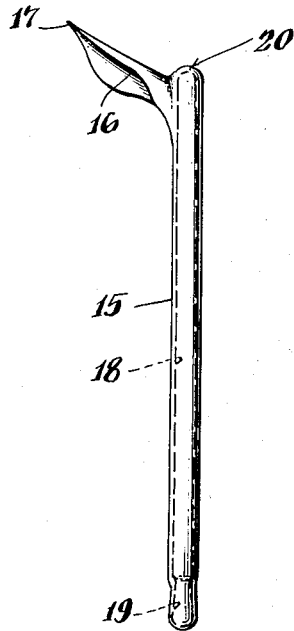
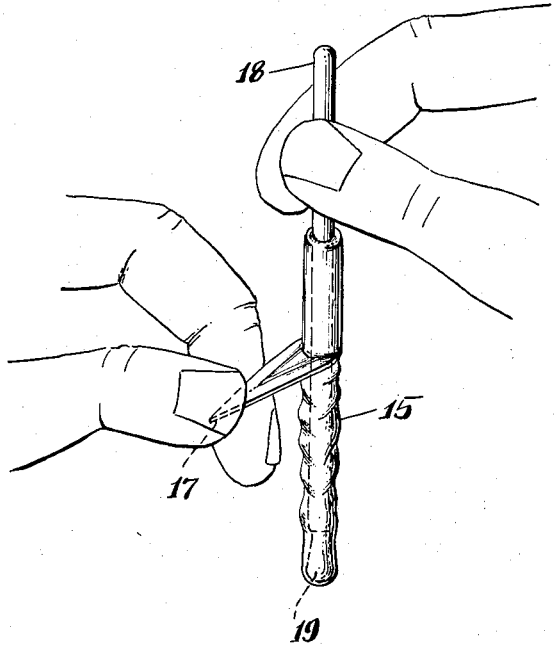
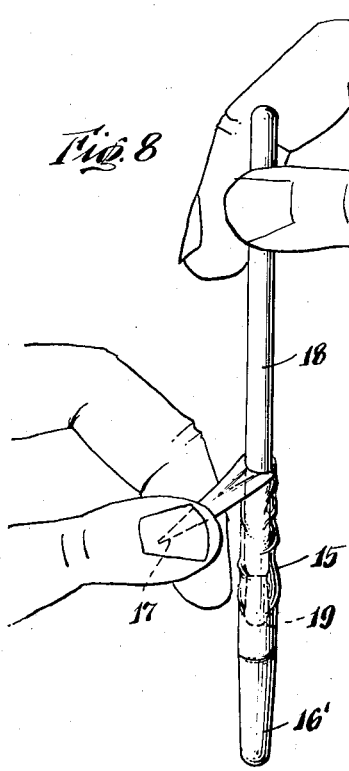
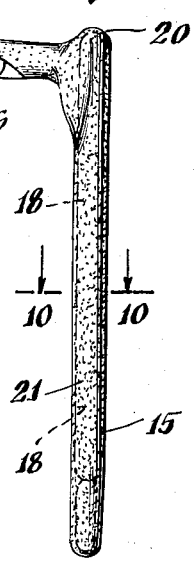
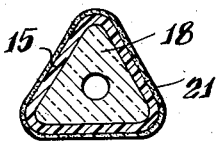
INVENTOR
Eugene M. Katzin
BY
Kane, Dalsimer and Kane
ATTORNEYS United States Patent Office 2,969,141
Patented Jan. 24, 1961

2,969,141

THERMOMETER COVER

Eugene M. Katzin, 50 Baldwin Ave., Newark, N.J.

Filed June 17, 1957, Ser. No. 666,142

1 Claim. (Cl. 206—16.5)

This invention relates to a structurally and functionally improved cover for thermometers and especially clinical thermometers; such cover being subject to a one-time use after which it may be thrown away.

By means of the present teachings an improved cover is presented which may readily be applied to and removed from a clinical thermometer so that it becomes unnecessary to clean that thermometer as it is employed to ascertain the body temperatures of successive patients.

A further object is that of providing a unit of this type which may readily be manufactured by machines and methods enabling its production for an extremely economical figure and which cover may be manipulated without difficulty by the user.

With these and other objects in mind reference is had to the attached sheets of drawings illustrating one practical embodiment of the invention and in which:

Fig. 1 is a perspective view of a cover;

Figs. 2 and 3 are similar views showing respectively the initial application of a cover to the thermometer and a subsequent step in such application;

Figs. 4 and 5 are likewise perspective views illustrating the final steps of application of the cover;

Fig. 6 is a side elevation of a clinical thermometer with the cover encasing the same.

Fig. 7 is a perspective view illustrating the initial step of removal of the cover from the thermometer.

Fig. 8 is a similar view showing the final step of removal;

Fig. 9 is a view similar to Fig. 6 and illustrating a cover applied to a thermometer of the oral type; and Fig. 10 is a transverse sectional view in enlarged scale taken along the line 10—10 in the direction of the arrows as indicated in Fig. 9.

Referring primarily to Fig. 1, the numeral 15 indicates the body of a sheath formed of a thin and elastic material such as artificial or natural rubber. One end of the sheath is closed and if desired may be defined by a reduced or tapered portion $16^1$. The material of the sheath may provide a body of constant thickness or gauge. Its outer end is open and is defined by an edge portion 16 extending at an angle to the axis of the sheath to terminate in a peak providing a manipulating tab. The over-all length of the tab from the tip on one side of the sheath to the opposite extreme end of the cut on the opposite side of the sheath is indicated particularly in Figures 6 and 9; it is at least equal to twice the largest transverse dimension of the sheath. The over-all length of the sheath should preferably be less than the similar length of the thermometer to which it is applied and the bore defined by the sheath should be larger than the diameter of that thermometer.

With a cover embodying this structure a thermometer embracing a stem 18 and bulb portion 19 may have the latter readily introduced into its bore as shown in Fig. 2. In such introduction the user will simply grasp the upper end of the stem with the thumb and forefinger of one hand and similarly grasp the tab portion 17 with the other hand. Under these circumstances the thermometer may be projected to a point where its bulb lies in contact with the closed surface of the sheath as shown in Fig. 3.

The sheath will, of course, be preferably supplied to the user in sterile condition. It is to be noted that this sterility is in no wise disturbed by the afore-described initial steps of applying the cover to the thermometer. Also it is not disturbed by the subsequent steps illustrated in Figs. 4 and 5. In those views it will be seen that the user may shift the grip afforded by one hand to a zone intermediate the thermometer end. Now by pulling the tab portion 17 axially in a direction away from bulb 19 of the thermometer, then as illustrated in Fig. 4, the material of the sheath is stretched so that the edge zone 16 of the same extends materially beyond the outer end of stem portion 18. With this sheath portion maintained under a condition of tension the user may now swing the outer end zone of the sheath to extend substantially perpendicular to the axis of the thermometer as shown in Fig. 5.

Under those circumstances and due to the tendency of the sheath to contract, that zone of the sheath which is in contact with the outer end of the stem will envelop the same and be prevented from displacing incident to the frictional engagement between the stem and the sheath. Therefore as shown at 20 in Fig. 5, a bulged or pocket portion will be included in the assembly and define that part of the sheath which envelops the outer stem zone. Under those circumstances and as illustrated in Fig. 6, without any restriction on the part of the operator the thermometer will remain housed and completely enveloped by the sheath excepting only that very restricted zone adjacent the upper end of the stem which is in line with the opening defined by edge portion 16.

The thermometer may now be used. With the body of the cover in stretched condition it will be relatively thin and offer little obstruction to the passage of heat from the patient's body to the bulb 19 and adjacent parts of the thermometer. After the proper interval of time adequate for registration has elapsed, the thermometer may be removed from contact with the patient. Under certain circumstances and if the sheath be adequately transparent the temperature registered by the thermometer may be observed through the same. However, ordinarily it will be preferable to expose the stem in order that the registration may be read with accuracy.

To this end and as shown in Fig. 7 the upper end of the stem 18 may be grasped after the tab 17 has been swung to assume a position co-extensive with the axis of the thermometer and the end of the stem has been aligned with the open end of the sheath. Of course, after such aligning or during the creation of the same the outer surfaces of the sheath may be gripped adjacent its open end and its body may be stretched by a pull on tab 17 to relieve the pocket provided by bulge 20.

In any event, by stripping down the sheath as in Fig. 7 the indicia on the stem will be rendered visible and the height of the mercury column or its equivalent may be observed in registration with the same. It is to be observed that during the foregoing operation the fingers of the user do not have to contact the area of the sheath adjacent to bulb 19. Under continued downward movement of the tab 17 as in Fig. 8 the sheath will free from the stem and bulb 19. Thereafter it may be discarded. A new sheath may be associated with the thermometer in accordance with the technique heretofore traversed under Figs. 1 to 5 inclusive.

As will be seen from Fig. 10 the sheath body will intimately engage with the faces of stem 18 as well as all surfaces of bulb 19 when the cover is properly applied to the thermometer. This, of course, occurs due to the fact that the bore of the sheath is diminished in diameter as the sheath is longitudinally stretched to assume the position shown in Fig. 6. In the case of an oral-type thermometer and especially where the same is to be used in rooms occupied by children, a coating 21 may be applied to the outer face of the sheath body. That coating can conveniently embrace a sweetened layer within which a flavoring extract such as peppermint may be embodied. Also substances having a pleasing odor may be incorporated in the layer, and these materials might be included in the body of the sheath.

Thus, among others, the several objects of the invention as specifically aforenoted are achieved. Obviously, numerous changes in construction and rearrangement of the parts may be resorted to without departing from the spirit of the invention as defined by the claim.

I claim:

A thermometer cover comprising a tubular elongated sheath of relatively thin substantially uniformly thick highly elastic material, the cross sectional area of the sheath being generally uniform along its entire length and dimensioned to loosely receive a clinical thermometer, the sheath being open at one end and closed at the other end, the open end of the sheath being cut at an angle, the cut extending from one side of the sheath at the open edge thereof through the opposite side of the sheath at a point below the open edge of the last mentioned side to form a substantially triangular shaped elongated tab, the distance from the tip of the tab on one side of the sheath to the extreme end of the cut on the opposite side being at least equal to twice the largest transverse dimension of the sheath, the sheath being deformable under tension exerted longitudinally to elongate longitudinally and to constrict transversely, the sheath deformable transversely with respect to the longitudinal axis of the sheath to engage a portion of the interior of the sheath with the end of a clinical thermometer in the sheath to dispose the elongated manipulating tab outwardly and generally transversely to the longitudinal axis of the sheath.

References Cited in the file of this patent
UNITED STATES PATENTS

| | | |
|---|---|---|
| 532,288 | Roberts | Jan. 8, 1895 |
| 1,363,259 | Mills | Dec. 28, 1950 |
| 2,768,736 | Govoni | Oct. 30, 1956 |
| 2,811,804 | Heath | Nov. 5, 1957 |